US009221476B2

(12) United States Patent
Breuer et al.

(10) Patent No.: US 9,221,476 B2
(45) Date of Patent: Dec. 29, 2015

(54) METHOD AND ARRANGEMENT FOR MONITORING A BRAKE SYSTEM OF A BRAKE ARRANGEMENT OF A RAIL VEHICLE

(71) Applicant: SIEMENS AKTIENGESELLSCHAFT, Munich (DE)

(72) Inventors: Werner Breuer, Munich (DE); Lars Loewenstein, Fuerth Vach (DE); Alexander Rambetius, Nuremberg (DE); Wolfgang Rulka, Munich (DE); Thorsten Stuetzle, Nuremberg (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 9 days.

(21) Appl. No.: 14/367,995

(22) PCT Filed: Oct. 29, 2012

(86) PCT No.: PCT/EP2012/071329
§ 371 (c)(1),
(2) Date: Jun. 23, 2014

(87) PCT Pub. No.: WO2013/091957
PCT Pub. Date: Jun. 27, 2013

(65) Prior Publication Data
US 2014/0343769 A1 Nov. 20, 2014

(30) Foreign Application Priority Data

Dec. 22, 2011  (DE) .................. 10 2011 089 653

(51) Int. Cl.
G05D 1/00 (2006.01)
B61H 11/00 (2006.01)
B60T 8/17 (2006.01)
B60T 17/22 (2006.01)
G08G 1/00 (2006.01)
G06F 17/00 (2006.01)
(Continued)

(52) U.S. Cl.
CPC ............ *B61H 11/005* (2013.01); *B60T 8/1705* (2013.01); *B60T 17/228* (2013.01);
(Continued)

(58) Field of Classification Search
CPC ............ G06F 7/00; G06F 17/00; B61B 1/00; B61H 11/00; B61H 11/005; G08G 1/20; B60T 8/1705; B60T 2270/413; B60T 17/228; B61L 27/04
See application file for complete search history.

(56) References Cited

U.S. PATENT DOCUMENTS 6,629,709 B1  10/2003  Tunley
6,905,180 B2  6/2005   Mayer
(Continued)

FOREIGN PATENT DOCUMENTS

DE  19510755 C2  10/1996
EP  1129888 A2   9/2001
(Continued)

OTHER PUBLICATIONS

Inertial Sensor. Wikipedia, The Free Encyclopedia. Apr. 4, 2014 17:32 UTC.URL:http://de.wikipedia.org/w/index.php?title=Inertialsensor&oldid=129212944 (Accessed: Jul. 7, 2014, 14:51 UTC).

*Primary Examiner* — Behrang Badii
(74) *Attorney, Agent, or Firm* — Laurence Greenberg; Werner Stemer; Ralph Locher

(57) ABSTRACT

A method and an arrangement monitor a brake system of a brake arrangement of a rail vehicle. To carry out such a method comparatively cost-effectively and gently on the wheels and rails, the deceleration of the rail vehicle is detected with a deceleration measured variable being obtained and the frictional connection between the wheel and rail is detected with a frictional connection measured variable being obtained. In the event of a small deceleration measured variable and a normal frictional connection measured variable, an error message signal is generated. In a brake system with at least one brake actuator, the deceleration of the rail vehicle is detected with a deceleration measured variable being obtained and the brake force of the at least one brake actuator is measured. In the case of a small deceleration measured variable and a low brake force, an error message signal is generated.

44 Claims, 4 Drawing Sheets

(51) Int. Cl.
*G06F 7/00* (2006.01)
*B61L 27/04* (2006.01)

(52) U.S. Cl.
CPC .......... *B61H 11/00* (2013.01); *B60T 2270/413* (2013.01); *B61L 27/04* (2013.01); *G06F 7/00* (2013.01); *G06F 17/00* (2013.01); *G08G 1/20* (2013.01)

(56) References Cited

U.S. PATENT DOCUMENTS 7,302,319 B2 * 11/2007 Wu .......................... B61L 27/04
                                                        104/27

2004/0225421 A1 * 11/2004 Wu .......................... B61L 27/04
                                                         701/19
2005/0038575 A1 *  2/2005 Wu .......................... B61L 27/04
                                                         701/19
2008/0116739 A1 *  5/2008 Lang ........................ B60T 8/172
                                                         303/15
2010/0292875 A1 * 11/2010 Gross ..................... B60T 8/1705
                                                         701/19

FOREIGN PATENT DOCUMENTS

WO      0071399 A1    11/2000
WO      0192076 A1    12/2001

* cited by examiner

METHOD AND ARRANGEMENT FOR MONITORING A BRAKE SYSTEM OF A BRAKE ARRANGEMENT OF A RAIL VEHICLE

BACKGROUND OF THE INVENTION

Field of the Invention

German patent DE 195 10 755 C2 discloses a brake arrangement for a rail-bound tractive unit having a plurality of brake systems. In this known brake arrangement, the braking effect is monitored by detecting the deceleration in the case of braking, and a deceleration signal is generated given too small a braking effect. By means of this deceleration signal, measures are automatically triggered which bring about the largest possible residual braking effect by using all of the brake systems which are present in the rail vehicle. In this context, the gritting system is also activated in order to take into account the possible error situation in which failure of the brake which is detected due to the occurrence of the error signal could be due to very low frictional engagement between the wheel and the rail. This leads to a situation in which the wear of the wheel and the rail is, under certain circumstances, unnecessarily increased through the activated gritting system, and grit is spread, possibly also in the region of sensitive rail switch tongues. Furthermore, a gritting system which has a relatively large volume and is therefore expensive has to be used.

BRIEF SUMMARY OF THE INVENTION

The invention is based on the object of specifying a method for monitoring a brake system of a brake arrangement having a plurality of brake systems of a rail vehicle, which method can be carried out comparatively cost-effectively while minimizing the wear and tear to the wheel and to the rail system.

The means of achieving this object are according to the invention a method for monitoring a brake system of a brake arrangement of a rail vehicle, in which the deceleration of the rail vehicle is detected by obtaining a deceleration measured variable and the frictional engagement between the wheel and the rail is detected by obtaining a frictional engagement measured variable; in the case of a small deceleration measured variable and a normal frictional engagement measured variable an error message signal is generated.

A significant advantage of the method according to the invention is that an error message signal is generated only when the brake system which is to be monitored is actually defective or disrupted, with the result that it is only then that, for example, a gritting system is selectively activated and/or a further brake system switched on. In the method according to the invention the grit is therefore handled more economically, which permits a relatively small gritting system and minimizes the wear and tear on the wheels and the rail system.

According to the invention, a further means of achieving the object specified above is a method for monitoring a brake system having at least one brake actuator of a brake arrangement having a plurality of brake systems of a rail vehicle, in which the deceleration of the rail vehicle is detected by obtaining a deceleration measured variable, and the braking force of the at least one brake actuator is measured; in the case of a small deceleration measured variable and a small braking force an error message signal is generated. The brake actuator is preferably an electric motor.

This embodiment of the method according to the invention is advantageous in particular in that a further brake system is not activated here immediately either but instead firstly it is checked whether there is a large probability of the excessively small deceleration being actually due to damage to the monitored brake system. Moreover, this embodiment also has the advantages specified above.

In the method according to the invention, the deceleration of the rail vehicle can be detected in a variety of ways. In order to achieve the most precise possible detection, a deceleration difference actual value is formed from a measured deceleration actual value and a predefined deceleration setpoint value and is compared with a deceleration difference threshold value by forming a deceleration difference intermediate value; in the case of a deceleration difference intermediate value which is above a tolerance value, an error message pre-signal is generated.

In particular in the case of a brake system of a brake arrangement of a rail vehicle for the high-speed field it is considered advantageous if the deceleration setpoint value is changed as a function of a measured speed actual value of the rail vehicle.

In order not to obtain an error message signal every time the rail vehicle comes to a stationary state at a low velocity, the speed actual value of the rail vehicle is advantageously compared with a speed limiting value; in the case of a speed actual value which is below the speed limiting value, the formation of the error message signal is blocked.

Alternatively, it is advantageously possible to measure a speed actual value of the rail vehicle and compare it with a speed limiting value, and in the case of a speed actual value which is below the speed limiting value, the deceleration difference threshold value can be increased.

The frictional engagement between the wheel and the rail can be detected in different ways with the method according to the invention. It is considered particularly advantageous if, in order to detect the frictional engagement between the wheel and the rail at at least one wheel set of the rail vehicle, a slip actual value is measured and is compared with a predefined slip threshold value; in the case of a slip actual value which is above the slip threshold value, a corresponding deceleration difference threshold value is formed as a frictional engagement measured variable.

In this context, the detection accuracy is advantageously increased if the deceleration difference threshold value is increased in accordance with the determined number of wheel sets with slip actual values which are above the slip threshold value.

It can also be advantageous if, in order to detect the frictional engagement between the wheel and the rail at at least one wheel set of the rail vehicle, a frictional engagement actual value in the wheel/rail contact is determined and is compared with a predefined frictional engagement threshold value, and in the case of a frictional engagement actual value which is below the frictional engagement threshold value, a corresponding deceleration difference threshold value is formed as a frictional engagement measured variable.

It is also advantageous here if the deceleration difference threshold value is increased in accordance with the determined number of wheel sets with frictional engagement actual values which are below the frictional engagement threshold value.

In order to check whether in the case of a brake system with brake actuators the latter possibly do not generate any driving effect at all, with the method according to the invention in the case of a brake system with at least one brake actuator a deceleration measurement signal and a speed measured variable of the rail vehicle are advantageously checked with respect to their signs, and in the case of identical signs an error signal for connecting a further brake system is generated immediately.

With the method according to the invention, in order to detect deceleration measured variables and speed measured variables sensors of differing designs are used. It is particularly advantageous to use an inertia sensor package. This applies particularly to the case in which the signs of the deceleration and speed of the rail vehicle are to be determined.

With the method according to the invention with detection of the braking force of brake actuators it is possible to measure this force in different ways. It therefore appears advantageous if the braking force measurement is carried out by means of a force measurement and/or torque measurement on an axle of the rail vehicle which is assigned to the brake actuator.

However, it may also be advantageous to perform the braking force measurement by means of sensors on a deformation body which is reversibly deformed by the braking.

The braking force measurement can also advantageously be carried out in the case of an electric actuator by measuring currents and voltages.

The further processing of the measured braking force is advantageously carried out in such a way that a force difference actual value is formed from a measured force actual value and a predefined force setpoint value, the force difference actual value is compared with a force difference threshold value by forming a force difference intermediate value, and in the case of a force difference intermediate value which is above a tolerance value, a force defect signal is generated.

In the case of a rail vehicle, in particular in the high-speed field, it can be advantageous if the force setpoint value is changed as a function of a measured speed actual value of the rail vehicle.

It can also be advantageous if the force setpoint value is changed as a function of the rotational speed of a wheel set which is connected to the brake actuator.

The invention is also based on the object of proposing an arrangement for monitoring a brake system of a brake arrangement having a plurality of brake systems of a rail vehicle, with which the brake system can be monitored cost-effectively while minimizing wear and tear to the wheel and rail system.

In order to achieve this object, according to the invention an arrangement is provided for monitoring a brake system of a brake arrangement having a plurality of brake systems of a rail vehicle, having a measuring device for the deceleration of the rail vehicle, a measuring apparatus for the frictional engagement between the wheel and the rail, and an evaluation arrangement which is arranged downstream of the measuring device and the measuring apparatus and outputs an error message signal in the case of a small deceleration of the rail vehicle and a normal frictional engagement between the wheel and the rail.

As a result, accordingly the same advantages can be achieved which have already been specified above with respect to the method according to the invention.

A further solution of the object specified above consists in an arrangement for monitoring a brake system having at least one brake actuator of a brake arrangement having a plurality of brake systems of a rail vehicle, having a measuring device for the deceleration of the rail vehicle, a measuring arrangement for the braking force of the at least one brake actuator, and an evaluation arrangement which is arranged downstream of the measuring device and the measuring arrangement and outputs an error message signal in the case of a small deceleration and a small braking force.

As a result, the same advantages can be achieved as are specified above with respect to the method for monitoring a brake system having at least one brake actuator.

With the arrangement according to the invention the measuring device can be embodied in different ways. The measuring device is particularly advantageously embodied in such a way that it forms a deceleration difference actual value from a measured deceleration actual value and a predefined deceleration setpoint value as a deceleration measured variable, it compares the deceleration difference actual value with a deceleration difference threshold value as a frictional engagement measured variable by forming a deceleration difference intermediate value, and in the case of a deceleration difference intermediate value which is above a tolerance value, it generates an error message pre-signal.

The arrangement according to the invention can also be embodied in different ways with respect to the detection of the speed. It appears advantageous if a detection device, in which the speed actual value of the rail vehicle is compared with a speed limiting value, is arranged upstream of the evaluation arrangement, and which detection device, in the case of a speed actual value which is below the speed limiting value, outputs a blocking signal to the evaluation arrangement, with which blocking signal formation of the error message signal in the evaluation arrangement is blocked.

In order to avoid an error message signal being output every time when the rail vehicle comes to a stationary state, the measuring device advantageously has on the input side an evaluation stage which is connected by its input to the output of an inertia sensor package and is embodied in such a way that it outputs at its output a speed measured variable, which is not influenced by the acceleration due to gravity or the centrifugal acceleration, of the rail vehicle. An inertia sensor package is known, for example, from http://de.wikipedia.org/wiki/Inertialsensor.

Furthermore, it is advantageous if the evaluation stage is also connected on the output side to the measuring apparatus and with its speed measured variable causes an increase in the deceleration difference threshold value to occur at said measuring apparatus in the case of a speed actual value which is below a speed limiting value.

Alternatively, it is also possible that in the case of a speed which is below a predefined threshold, checking for an excessively low deceleration actual value is not performed at all.

With the arrangement according to the invention, the frictional engagement between the wheel and the rail can be detected in different ways; a plurality of possibilities are known for this. It is advantageous if, with the arrangement according to the invention, in order to detect the frictional engagement between the wheel and the rail at at least one wheel set of the rail vehicle, a slip actual value measuring stage is provided in which the measured slip actual value is compared with a predefined slip threshold value, and which, in the case of a slip actual value which is above the slip threshold value, brings about an increase in the corresponding deceleration difference threshold value.

In this context it is also advantageous if a counter for determining the number of wheel sets with slip actual values which are above the slip threshold value is present, which counter generates a signal for increasing the deceleration difference threshold value in accordance with the determined number of wheel sets with slip actual values which are above the slip threshold value.

It also appears advantageous if, in order to detect the frictional engagement between the wheel and the rail at at least one wheel set of the rail vehicle, a measuring stage for the frictional engagement actual value in the wheel/rail contact is provided, which measuring stage is designed to compare the frictional engagement actual value with a predefined frictional engagement threshold value and to form a corresponding deceleration difference threshold value in the case of a frictional engagement actual value which is below the frictional engagement threshold value.

In this embodiment of the arrangement according to the invention a counting stage is advantageously present which detects the number of wheel sets with frictional engagement actual values which are below the frictional engagement threshold value and outputs a counting signal for increasing the deceleration difference threshold value in accordance with the determined number of wheel sets with frictional engagement actual values which are below the frictional engagement threshold value.

In order to check damage to the brake system directly with the arrangement according to the invention having a brake actuator it is advantageous if at least one force/torque meter is arranged upstream of the measuring arrangement of the arrangement according to the invention and is provided on an axle of the rail vehicle which is assigned to the brake actuator.

It is particularly advantageous if the measuring arrangement and the evaluation arrangement are embodied in such a way that they form a braking force difference actual value from a measured braking force actual value and a predefined braking force setpoint value, they compare the braking force difference actual value with a braking force difference threshold value by forming a braking force difference intermediate value, and in the case of a braking force difference intermediate value which is above a tolerance value, they generate a braking force defect signal (LF).

However, it can also be advantageous for a deformation body which can be reversibly deformed by the braking to be provided with sensors for measuring the braking force.

Alternatively or additionally, in the case of an electric actuator it is advantageously possible to assign a current measuring device and/or voltage measuring device thereto for measuring the braking force.

In addition it is considered as advantageous if a high-speed activation stage is provided which is supplied on the input side with a measured variable which is proportional to the deceleration and with a measured variable which is proportional to the speed of the rail vehicle, and said high-speed activation stage is embodied in such a way that it checks the measured variables with respect to their signs, and in the case of identical signs immediately generates an error signal for connecting a further brake system. Such a high-speed connection stage is advantageous not only in the present context but also can generally be used advantageously in any arrangement for monitoring a brake system in which apart from the deceleration the speed of the rail vehicle is also detected.

For this purpose, an inertia sensor package is advantageously provided with which the magnitude and signs of the deceleration and speed of the rail vehicle are determined.

In order to explain the invention further,

DESCRIPTION OF THE INVENTION

Figure 1:
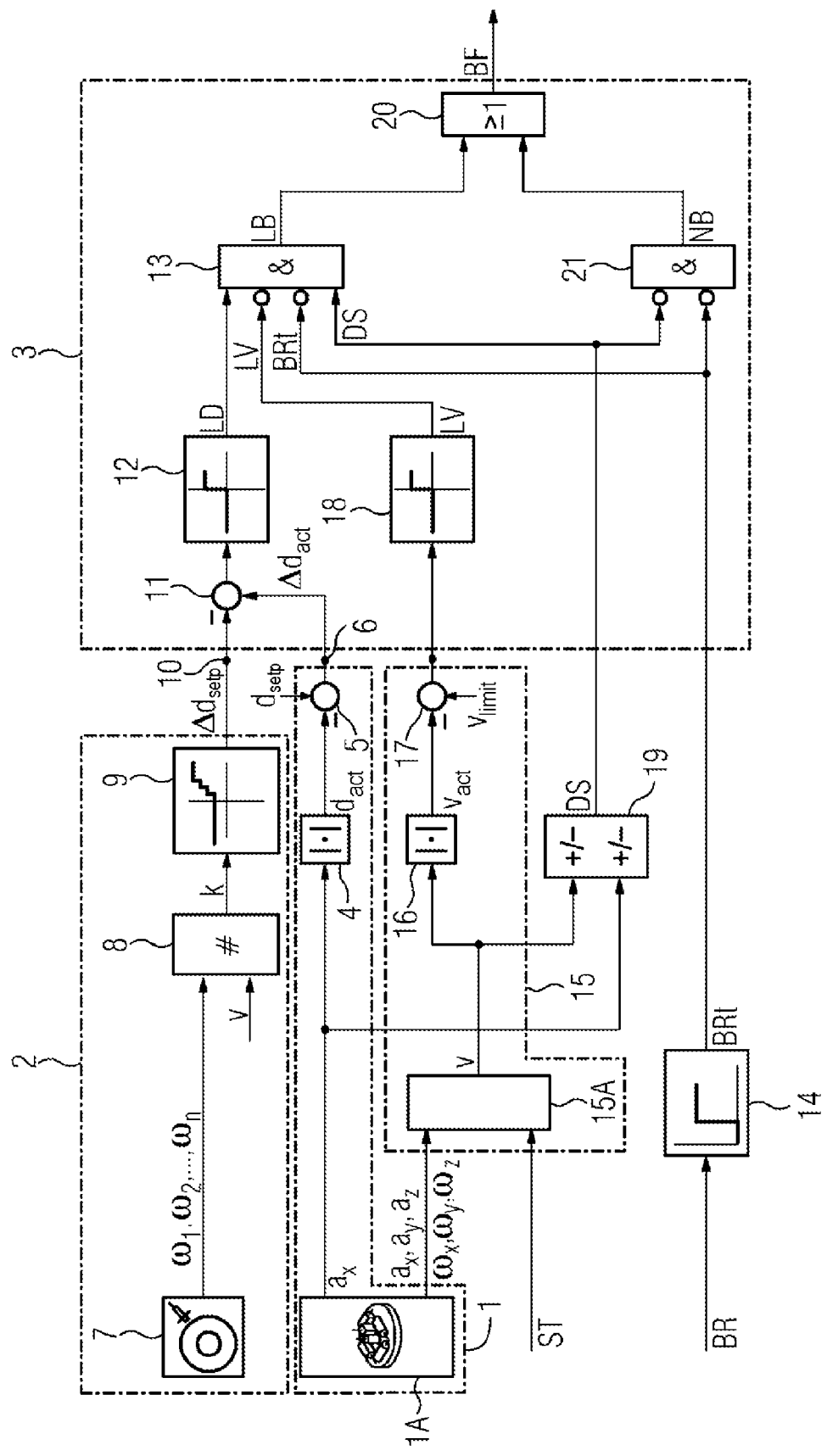
FIG. 1 illustrates an exemplary embodiment of the arrangement according to the invention for monitoring a brake system.

The arrangement which is illustrated in FIG. 1 for monitoring a brake system of a brake arrangement of a rail vehicle (not illustrated) contains, as essential components, a measuring device 1 for detecting the deceleration of the rail vehicle, a measuring apparatus 2 for detecting the frictional engagement between the wheel and the rail in the case of the rail vehicle, and an evaluation arrangement 3 which outputs an error message signal BF when there is a small deceleration of the rail vehicle compared to the normal case and a normal frictional engagement between the wheel and the rail.

The measuring device 1 contains an inertia sensor package 1A which has an acceleration sensor which is not illustrated individually and which is parallel to the vehicle longitudinal axis of the rail vehicle. A deceleration actual value $a_x$ is measured with this acceleration sensor of the inertia sensor package 1A. Connected to the inertia sensor package 1A or to the acceleration sensor thereof is an absolute value former 4 which forms the absolute value of the measured deceleration actual value and generates a positive deceleration actual value $d_{act}$ at its output. Arranged downstream of the absolute value former 4 is in turn a subtractor 5 which is also supplied with a deceleration setpoint value $d_{setp}$. A deceleration difference actual value $\Delta d_{act}$ is then produced at the output of the subtractor 5 and therefore also at the output 6 of the measuring device 1.

The measuring apparatus 2 contains a rotational speed sensor 7 with which the rotational speeds ($\omega_1, \omega_2 \ldots, \omega_n$ are measured, wherein the various axle rotational speeds correspond to the various braked wheel sets of the rail vehicle. The axle rotational speed measured variables which are acquired in this way are fed to an element 8 which determines the number k of wheel sets with a low frictional engagement between the wheel and the rail. This element 8 is also supplied with a measured variable v which corresponds to the velocity of the rail vehicle, which measured variable v is obtained in a manner which will be described in more detail below. In the element 8, the actual value of the slip between the wheel and the rail is determined for each wheel set at which the brake system is to be active, using the wheel radii actual values, the axle rotational speeds which are obtained and the velocity v. If the respective slip actual value exceeds a predefined slip threshold value, the associated wheel set is considered to be slipping and braking with a low frictional engagement. By summing, the element 8 obtains the number k of wheel sets with a low frictional engagement and feeds this value to a nonlinear element 9. The nonlinear element 9 determines a positive deceleration difference threshold value $\Delta d_{setp}$ as a function of the number of slipping wheel sets k using a monotonously rising function. This means that as the number of slipping wheel sets k increases, the deceleration difference threshold value $\Delta d_{setp}$ increases. As a result, the permitted tolerance for the difference between the setpoint deceleration and actual deceleration accordingly increases. Owing to this frictional-engagement-dependent adaptation of the tolerance it is possible with a high level of probability to assume that an error message signal actually occurs only in the case of damage to the brake system used in the rail vehicle. The deceleration difference threshold value signal $\Delta d_{setp}$ occurs at an output 10 of the measuring apparatus 2.

The evaluation arrangement 3 which is arranged downstream of the measuring device 1 and the measuring apparatus 2 has on the input side a further subtractor 11 to which on the one hand the deceleration difference actual value $\Delta d_{act}$ is fed by the measuring device 1 and the deceleration difference threshold value $\Delta d_{setp}$ is fed by the measuring apparatus 2; a deceleration difference intermediate value $\Delta d_{zw}$ is then present at the input of the further subtractor 11. If the output of the further subtractor 11 is larger than zero, the logic signal <0 is set at its output to a high level by a downstream two-point element 12. A high level of the signal LD indicates an excessively low deceleration of the entire rail vehicle and therefore constitutes a deceleration defect signal LD. If the output of the further subtractor 11 is less than zero, the logic signal remains at a low level.

The deceleration defect signal LD is fed to an AND gate 13 to which further logic signals LV, BRt and DS are fed. So that these four signals give rise to a logic error message intermediate signal LB at the output of the AND gate 13, further conditions must be met, details of which will be given below.

Firstly a braking request must actually be present since this signals that a braking process is underway. Such a braking request is represented by the low level of the logic signal BR with which a lag element 14 is supplied. The signal BR is delayed by the duration of the necessary braking force design by means of this lag element 14; this results in the output signal BRt of the lag element 14 with a high level.

The monitoring of the braking effect of the brake system to be monitored takes place appropriately exclusively above a limiting velocity $v_{limit}$. For this purpose, the measured variable of the velocity v is firstly acquired from the sensor signals of the inertia sensor package 1A through suitable evaluation in an evaluation stage 15A. Depending on the direction in which the vehicle is traveling, the sign of the measured variable of the velocity v can be positive or negative, for which reason the measured variable is fed to a further absolute value former 16. In this absolute value former 16, a positive velocity actual value $v_{act}$ is formed, which velocity actual value $v_{act}$ is subtracted from the positive velocity limiting value $v_{limit}$ using an additional subtractor 17; the absolute value former 16 and the additional subtractor 17 form, together with the evaluation stage 15A, a detection device 15. As soon as the velocity actual value is below the velocity limiting value $v_{limit}$, the output of the additional subtractor is greater than zero and a further two-point element 18 switches its logic output signal as a blocking signal LV to a high level.

Furthermore, in the illustrated exemplary embodiment it is to be ensured that actuators, which are provided for braking and are not illustrated, of the brake system to be monitored do not generate a driving effect. The downstream evaluation element 19 determines whether the signs of the speed v and of the deceleration $a_x$ are different. Only if this is the case does the additional element 19 output the logic signal DS with a high level.

If all the signals LD, LV, BRt and DS are present with a high level at the AND gate 13 simultaneously, the latter generates a signal LB which is fed to an OR element 20. A signal NB of a further AND element 21, which is supplied with the logic signal DS by the further element 19 and with the signal BRt by the lag stage 14, is also present on the input side at this OR element 20.

With the further AND gate 21 it is checked whether or not the brake system to be monitored generates a driving effect. If this is the case, the signal DS has a high level and in the case of a signal BRt also having a high level the logic signal NB at the output of the further AND gate 21 is set to a high level.

The two logic signals LB and NB therefore each signal damage to the monitored brake system with the result that a logic signal BF is output as an error message signal by the OR gate 20. In the case of a high level, at least one other brake system than that already used is activated by the error message signal BF.

Figure 2:
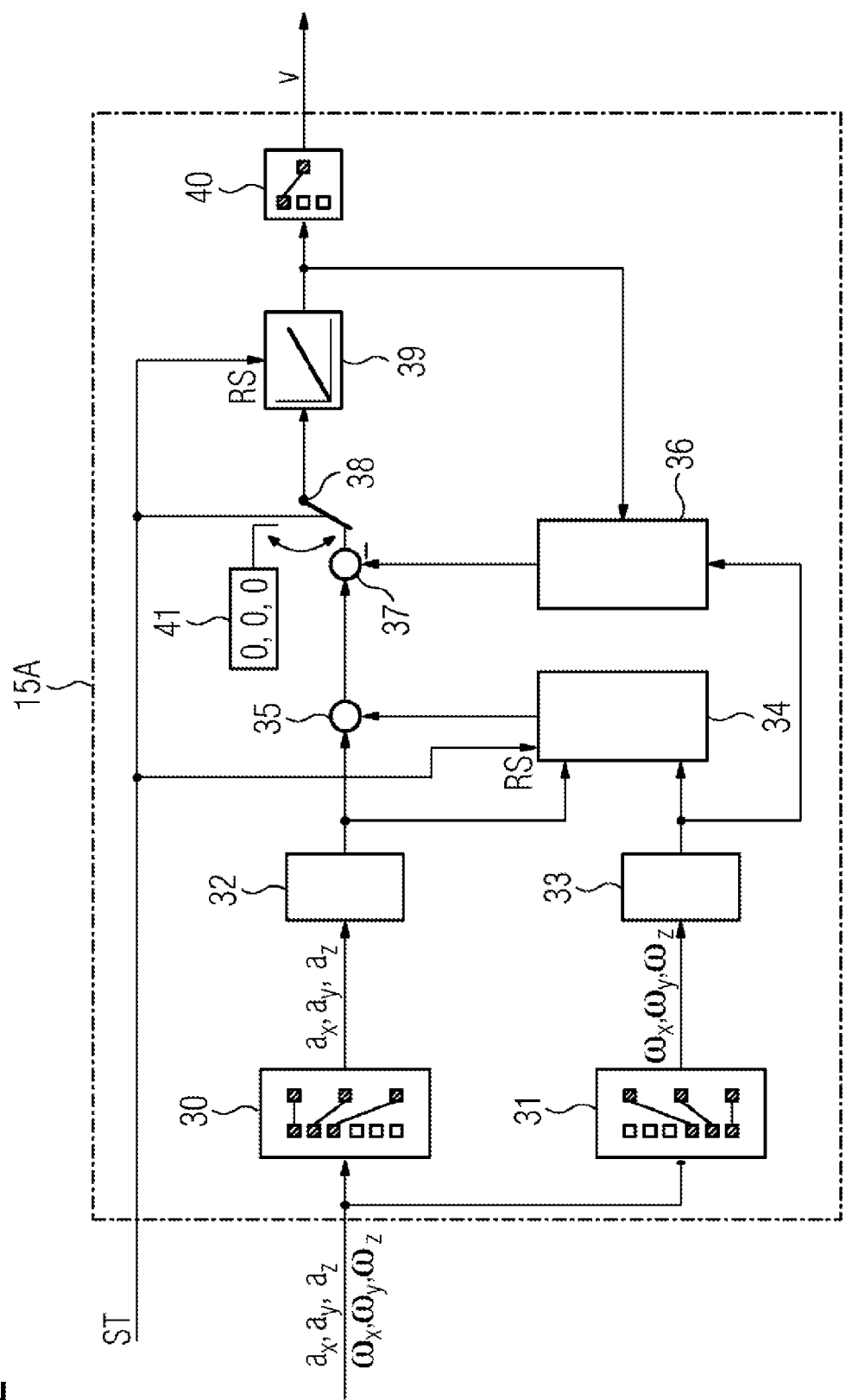
FIG. 2 illustrates an exemplary embodiment of an evaluation stage according to the exemplary embodiment in FIG. 1.

The evaluation stage 15A which is illustrated in FIG. 2 is, on the one hand, connected on the input side to the inertia sensor package 1A according to FIG. 1 and also supplied with a stationary state signal ST, which is set to a high level, if the rail vehicle is stationary. On the input side, the evaluation stage 15A is provided with two splitters 30 and 31 with which the six signals $a_x$, $a_y$, $a_z$ and $\omega_x$, $\omega_y$ and $\omega_z$ are firstly divided into three acceleration signals $a_x$, $a_y$ and $a_z$ as well as into three rotational speed signals $\omega_x$, $\omega_y$ and $\omega_z$. The measuring axis of the sensor which is associated with the acceleration signal $a_x$ is parallel to the longitudinal axis of the rail vehicle here. The sensor signals each have bias errors, cross-sensitivity errors, a temperature response, measuring noise etc. In a compensation element 32, these errors are compensated in the case of the acceleration signals according to known methods. The same occurs with the rotational speed signals in the additional compensation element 33. Arranged downstream of the two compensation elements 32 and 33 is a transformation element 34 in which, according to the known method, the vector for the acceleration due to gravity of the inertia system is transformed into the sensor coordinate system by, for example, calculating the Euler angle.

The transformed vector serves to compensate the portion of the acceleration due to gravity which is contained in the measured acceleration signals by using a summing element 35, which is also connected to the one compensation element 32.

On the input side an element 36 for determining the centrifugal acceleration is also connected to the output of the additional compensation element 33, in which element 36 the portion of the centrifugal acceleration which is contained in the acceleration signals is obtained according to the known method. A further summing element 37 is arranged downstream of this element 36 for obtaining the centrifugal acceleration and is also connected by a further input to the output of the summing element 35. The acceleration signals which are compensated by the acceleration due to gravity and the centrifugal acceleration are therefore present at the output of the further subtractor 37.

A switch 38 which is arranged downstream of the further summing element feeds the compensated acceleration signals to an integrator 39, downstream of which an additional splitter 40 is arranged. The first signal which is selected by this splitter 40 is the velocity v.

The logic stationary state signal ST is set to a high level by a device which is not shown if the rail vehicle is stationary. As soon as this signaling takes place, the compensated accelerations are set to zero using the element 41 by the switch 38. Likewise, the time integrals are set to zero by means of a reset input RS of the integrator 39, as a result of which the drifting time integrals or the velocity are calibrated.

In the transformation element 34, an integrator can be contained which is used to calculate the transformed vector for the acceleration due to gravity. The integrator is set to new initial values at the high level of the logic stationary state signal ST, which new initial values can depend on the current values of the measured acceleration signals $a_x$, $a_y$ and $a_z$.

Figure 3:
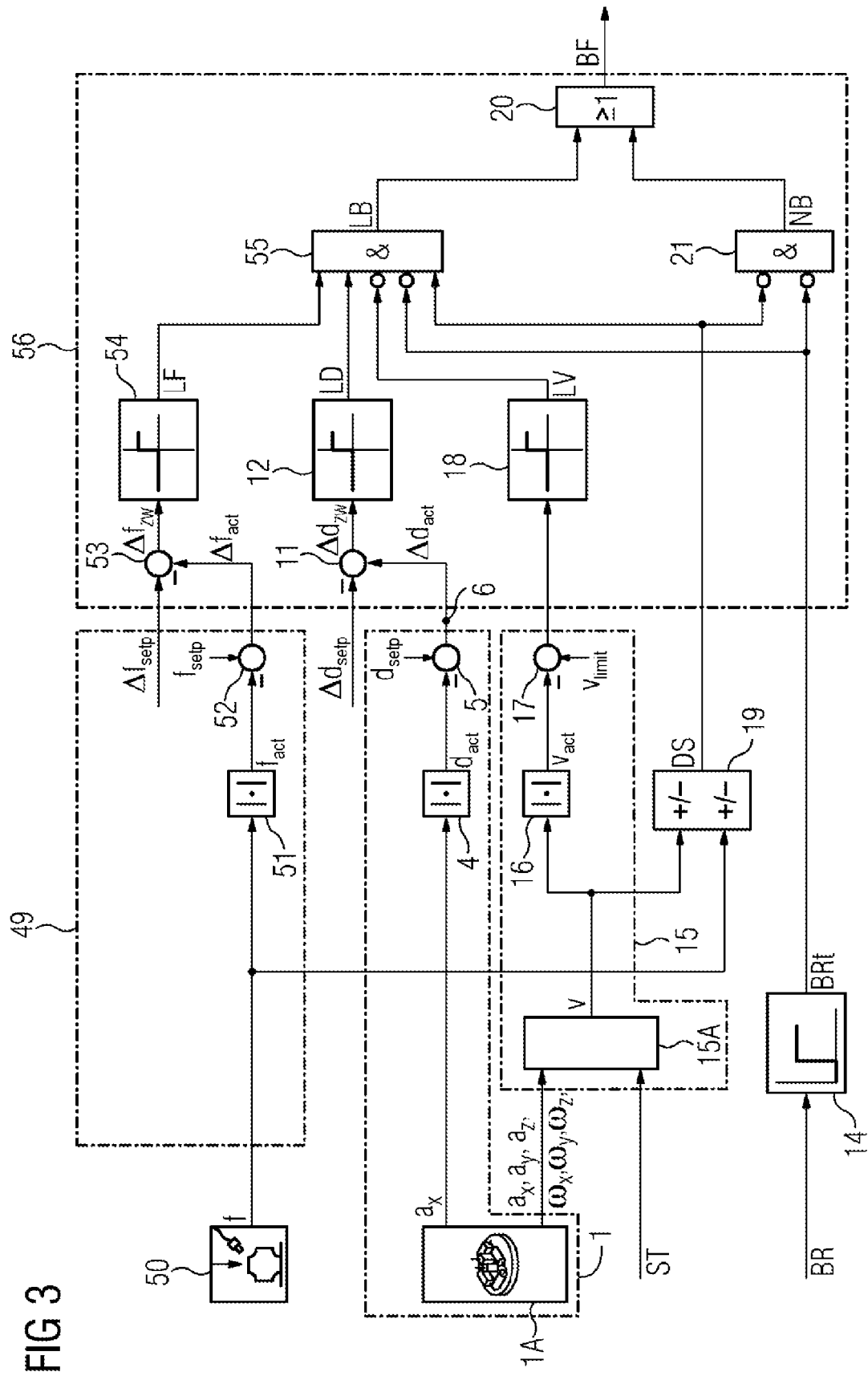
FIG. 3 illustrates a further exemplary embodiment of the arrangement according to the invention for monitoring a brake system having a brake actuator.

The exemplary embodiment according to FIG. 3 coincides in large part to that according to FIG. 1, for which reason identical reference symbols are used for corresponding parts. A measuring apparatus is no longer provided here, instead a deceleration difference threshold value signal $\Delta d_{setp}$ is permanently predefined. However, a measuring arrangement 49 is arranged downstream of a force sensor 50 which is connected in a way not illustrated to a brake system which is to be monitored and has at least one brake actuator.

In the present exemplary embodiment, by using the sensor 50 the force f is measured in order to obtain the braking effect of the brake actuator (not shown) on an axle of the rail vehicle which is assigned thereto. Since the measured variable which corresponds to the force f is signed, it is initially fed to an absolute value former 51 which forms the positive force actual value $f_{act}$. The positive force actual value $f_{act}$ is subtracted from the pre definable positive force setpoint value $f_{setp}$ using a subtractor 52. The force setpoint value $f_{setp}$ can also be here, for example, the absolute value of the setpoint value for controlling the brake actuator, which can preferably be embodied as an electric motor. If the force actual value is below the force setpoint value, the force difference actual value $\Delta f_{act}$ is greater than zero. The positive force difference threshold value $\Delta f_{setp}$ is subtracted from the force difference actual value $\Delta f_{act}$ using a further subtractor 53. The force difference threshold value $\Delta f_{setp}$ indicates the permitted tolerance of the difference between the setpoint force and the actual force. If the difference exceeds the tolerance, i.e. if the signal at the output of the subtractor 53 is greater than zero, a two-point element 54 sets the logic signal LF to a high level. If the tolerance is not exceeded, the logic signal LF remains at a low level. A high level of the logic signal LF therefore indicates an excessively low effect of the brake actuator or electric motor, which effect is due to damage to the brake actuator. By means of the AND element 55, which has here a total of five inputs in contrast to the AND element 13 according to FIG. 1, the error message signal BF is then generated at the output of an evaluation arrangement 56 which is changed only to a relatively small degree compared to the exemplary embodiment according to FIG. 1.

In the illustrated exemplary embodiment it is assumed that, owing to the installation direction of the brake actuator or electric motor, the signs of the velocity v and of the force f are always different when the brake actuator or electric motor generates a braking effect. Both signs are compared with one another using the evaluation element 19. Only in the case of different signs does the logic signal DS at the output of the two-point element 19 receive a high level. The logic signal DS in the exemplary embodiment shown in FIG. 3 thus signals a braking brake actuator or electric motor, while in the exemplary embodiment shown in FIG. 1 it stands for non-driving actuators. The signal DS is further processed in the same way in both exemplary embodiments.

Figure 4:
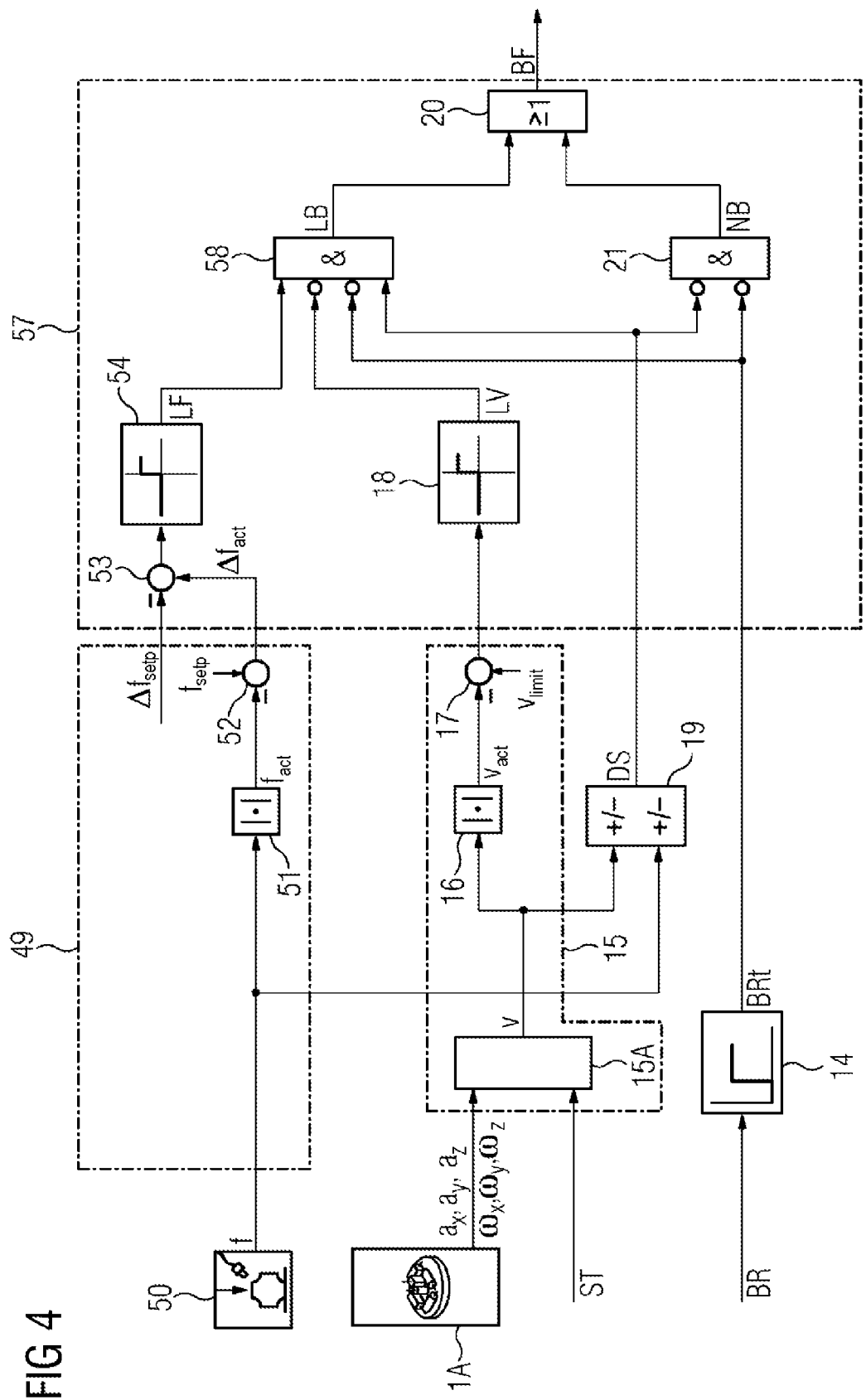
FIG. 4 illustrates an additional exemplary embodiment of the arrangement according to the invention in an embodiment which is simplified compared to the exemplary embodiment according to FIG. 3, each of the figures being illustrated as a block circuit diagram.

In the exemplary embodiment according to FIG. 4, in which parts corresponding to parts according to FIG. 3 are provided with the same reference symbols, the arrangement according to the invention is still further simplified compared to the exemplary embodiment according to FIG. 3. The exemplary embodiment according to FIG. 4 does not in fact require the components 4 and 5 of the measuring device 1 according to FIG. 3, with the result that here the measuring device is only composed of the inertia sensor package 1A. The evaluation arrangement 57 does not need the elements 11 and 12 of the evaluation arrangement 56 according to FIG. 3. The logic signal LD accordingly does not occur. The criterion for an excessively low overall deceleration of the rail vehicle, which could be due to damage to the brake system used, is therefore dispensed with in this exemplary embodiment. Correspondingly, an AND gate 58 with four inputs is sufficient.

The invention claimed is:

1. A method for monitoring a brake system of a brake configuration having a plurality of brake systems of a rail vehicle, which comprises the steps of:
   determining a deceleration of the rail vehicle by obtaining a deceleration measured variable;
   determining a frictional engagement between a wheel and a rail by obtaining a frictional engagement measured variable; and
   generating an error message signal in a case of a small deceleration measured variable and a normal frictional engagement measured variable.

2. The method according to claim 1, which further comprises:
   forming a deceleration difference actual value from a measured deceleration actual value and a predefined deceleration setpoint value as the deceleration measured variable;
   comparing the deceleration difference actual value with a deceleration difference threshold value by forming a deceleration difference intermediate value; and
   generating a deceleration defect signal in a case of the deceleration difference intermediate value being above a tolerance value.

3. The method according to claimed in claim 2, which further comprises changing the predefined deceleration setpoint value in dependence on a measured speed actual value of the rail vehicle.

4. The method according to claim 3, which further comprises:
   comparing the measured speed actual value of the rail vehicle with a speed limiting value; and
   blocking a formation of the error message signal in a case of the measured speed actual value being below the speed limiting value.

5. The method according to claim 2, which further comprises:
   measuring a speed actual value of the rail vehicle;
   comparing the speed actual value measured with a speed limiting value; and
   increasing the deceleration difference threshold value in a case of the speed actual value being below the speed limiting value.

6. The method according to claim 2, which further comprises:
   measuring a slip actual value;
   comparing the slip actual value measured with a predefined slip threshold value to detect the frictional engagement between the wheel and the rail at at least one wheel set of the rail vehicle; and
   forming a corresponding deceleration difference threshold value as a frictional engagement measured variable in a case of the slip actual value being above the predefined slip threshold value.

7. The method according to claim 6, which further comprises increasing the deceleration difference threshold value in accordance with a determined number of wheel sets with slip actual values which are above the predefined slip threshold value.

8. The method according to claim 1, which further comprises:
   determining and comparing a frictional engagement actual value in the wheel/rail contact with a predefined frictional engagement threshold value in order to detect the frictional engagement between the wheel and the rail at at least one wheel set of the rail vehicle; and forming a corresponding deceleration difference measured variable in a case of the frictional engagement actual value being below the frictional engagement threshold value.

9. The method according to claim 8, which further comprises increasing the deceleration difference threshold value in accordance with the determined number of wheel sets with frictional engagement actual values which are below the frictional engagement threshold value.

10. A method for monitoring a brake system having at least one brake actuator of a brake configuration having a plurality of brake systems of a rail vehicle, which comprises the steps of:

determining a deceleration of the rail vehicle by obtaining a deceleration measured variable;

measuring a braking force of the at least one brake actuator; and generating an error message signal in a case of a small deceleration measured variable and a small braking force.

11. The method according to claim 10, which further comprises:

forming a deceleration difference actual value from a measured deceleration actual value and a predefined deceleration setpoint value as the deceleration measured variable;

comparing the deceleration difference actual value with a deceleration difference threshold value by forming a deceleration difference intermediate value; and generating a deceleration defect signal in a case of the deceleration difference intermediate value being above a tolerance value.

12. The method according to claimed in claim 11, which further comprises changing the predefined deceleration setpoint value in dependence on a measured speed actual value of the rail vehicle.

13. The method according to claim 12, which further comprises:

comparing the measured speed actual value of the rail vehicle with a speed limiting value; and blocking a formation of the error message signal in a case of the measured speed actual value being below the speed limiting value.

14. The method according to claim 11, which further comprises:

measuring a speed actual value of the rail vehicle;

comparing the speed actual value measured with a speed limiting value; and increasing the deceleration difference threshold value in a case of the speed actual value being below the speed limiting value.

15. The method according to claim 10, which further comprises:

checking a deceleration measurement signal and a speed measured variable of the rail vehicle with respect to their signs in a case of the brake system with the at least one brake actuator, and in a case of identical signs an error signal for connecting a further brake system is generated immediately.

16. The method according to claim 15, which further comprises determining the signs of the deceleration measurement signal and the speed measured variable of the rail vehicle by means of an inertia sensor package.

17. The method according to claim 10, which further comprises carrying out a braking force measurement by means of a force measurement and/or torque measurement on an axle of the rail vehicle which is assigned to the brake actuator.

18. The method according to claim 10, which further comprises carrying out a braking force measurement by means of sensors on a deformation body which is reversibly deformed by braking.

19. The method according to claim 10, which further comprises carrying out a braking force measurement in a case of an electric actuator by measuring currents and voltages.

20. The method according to claim 16, which further comprises:

forming a force difference actual value from a measured force actual value and a predefined force setpoint value;

comparing the force difference actual value with a force difference threshold value by forming a force difference intermediate value; and generating a force defect signal in a case of the force difference intermediate value being above a tolerance value.

21. The method according to claim 20, which further comprises changing the predefined force setpoint value in dependence on a measured speed actual value of the rail vehicle.

22. The method according to claim 20, which further comprises changing the predefined force setpoint value in dependence on a rotational speed of a wheel set which is connected to the brake actuator.

23. A configuration for monitoring a brake system of a brake arrangement having a plurality of brake systems of a rail vehicle, the configuration comprising:

a measuring device for measuring a deceleration of the rail vehicle;

a measuring apparatus for determining a frictional engagement between a wheel and a rail; and an evaluation configuration disposed downstream of said measuring device and said measuring apparatus and outputting an error message signal in a case of a small deceleration of the rail vehicle and a normal frictional engagement between the wheel and the rail.

24. The configuration according to claim 23, wherein:

said measuring device and said evaluation configuration are embodied such that they form a deceleration difference actual value from a measured deceleration actual value and a predefined deceleration setpoint value as a deceleration measured variable, they compare the deceleration difference actual value with a deceleration difference threshold value as a frictional engagement measured variable by forming a deceleration difference intermediate value, and in a case of the deceleration difference intermediate value being above a tolerance value, they generate a deceleration defect signal.

25. The configuration according to claim 24, further comprising:

a detection device, in which a speed actual value of the rail vehicle is compared with a speed limiting value, and disposed upstream of said evaluation configuration, said detection device, in a case of the speed actual value being below the speed limiting value, outputting a blocking signal to said evaluation configuration, with the blocking signal present a formation of the error message signal in said evaluation configuration is blocked.

26. The configuration according to claim 25, wherein:

said measuring device has an inertia sensor package with an output; and said detection device has an input side with an evaluation stage having an output and an input connected to said output of said inertia sensor package, said evaluation stage embodied such that said evaluation stage outputs at said output a speed measurement variable, which is not influenced by acceleration due to gravity or a centrifugal acceleration, of the rail vehicle.

27. The configuration according to claim 26, wherein said output of said evaluation stage is connected to said measuring apparatus and with the speed measurement variable causes an increase in the deceleration difference threshold value to occur at said measuring apparatus in a case of the speed actual value being below a speed limiting value.

28. The configuration according to claim 23, wherein said measuring apparatus in order to detect the frictional engagement between the wheel and the rail at at least one wheel set of the rail vehicle, has a slip actual value measuring stage in which a measured slip actual value is compared with a predefined slip threshold value, and which, in a case of a slip actual value being above a slip threshold value, brings about an increase in a corresponding deceleration difference threshold value.

29. The configuration according to claim 28, wherein said measuring apparatus has a counter for determining a number of wheel sets with slip actual values which are above the slip threshold value being present, said counter generates a signal for increasing the deceleration difference threshold value in accordance with a determined number of wheel sets with the slip actual values being above the slip threshold value.

30. The configuration according to claim 24, wherein said measuring apparatus in order to detect the frictional engagement between the wheel and the rail at at least one wheel set of the rail vehicle, has a measuring stage for a frictional engagement actual value in the wheel/rail contact, said measuring stage comparing the frictional engagement actual value with a predefined frictional engagement threshold value and forms a corresponding deceleration difference threshold value in a case of the frictional engagement actual value being below the predefined frictional engagement threshold value.

31. The configuration according to claim 30, wherein said measuring apparatus has a counting stage for detecting a number of wheel sets with frictional engagement actual values which are below the predefined frictional engagement threshold value and outputs a counting signal for increasing the deceleration difference threshold value in accordance with a determined number of wheel sets with the frictional engagement actual values being below the frictional engagement threshold value.

32. The configuration according to claim 23, further comprising a high-speed activation stage having an input side supplied with a measured variable being proportional to the deceleration and with a further measured variable which is proportional to a speed of the rail vehicle, said high-speed activation stage is embodied in such a way that said high-speed activation stage checks the measured variable and the further measured variable with respect to their signs, and in a case of identical signs immediately generates an error signal for connecting a further brake system.

33. The configuration according to claim 32, wherein said wherein said measuring device has an inertia sensor package with which a magnitude and signs of the deceleration and the speed of the rail vehicle are determined.

34. A configuration for monitoring a brake system having at least one brake actuator of a brake configuration having a plurality of brake systems of a rail vehicle, the configuration comprising:
a measuring device for measuring a deceleration of the rail vehicle;
a measuring configuration for determining a braking force of the at least one brake actuator; and
an evaluation configuration disposed downstream of said measuring device and said measuring configuration and outputting an error message signal in a case of a small deceleration and a small braking force.

35. The configuration according to claim 34, wherein:
said measuring device and said evaluation configuration are embodied such that they form a deceleration difference actual value from a measured deceleration actual value and a predefined deceleration setpoint value as a deceleration measured variable, they compare the deceleration difference actual value with a deceleration difference threshold value as a frictional engagement measured variable by forming a deceleration difference intermediate value, and in a case of the deceleration difference intermediate value being above a tolerance value, they generate a deceleration defect signal.

36. The configuration according to claim 35, further comprising:
a detection device, in which a speed actual value of the rail vehicle is compared with a speed limiting value, and disposed upstream of said evaluation configuration, said detection device, in a case of the speed actual value being below the speed limiting value, outputting a blocking signal to said evaluation configuration, with the blocking signal present a formation of the error message signal in said evaluation configuration is blocked.

37. The configuration according to claim 36, wherein:
said measuring device has an inertia sensor package with an output; and
said detection device has an input side with an evaluation stage having an output and an input connected to said output of said inertia sensor package, said evaluation stage embodied such that said evaluation stage outputs at said output a speed measurement variable, which is not influenced by acceleration due to gravity or a centrifugal acceleration, of the rail vehicle.

38. The configuration according to claim 37, wherein said output of said evaluation stage is connected to said measuring apparatus and with the speed measurement variable causes an increase in the deceleration difference threshold value to occur at said measuring apparatus in a case of the speed actual value being below the speed limiting value.

39. The configuration according to claim 35, further comprising at least one force/torque meter disposed upstream of said measuring configuration and is provided on an axle of the rail vehicle assigned to the brake actuator.

40. The configuration according to claim 39, wherein said measuring configuration and said evaluation configuration are embodied in such a way that they form a braking force difference actual value from a measured braking force actual value and a predefined braking force setpoint value, they compare the braking force difference actual value with a braking force difference threshold value by forming a braking force difference intermediate value, and in a case of the braking force difference intermediate value being above a tolerance value, they generate a braking force defect signal.

41. The configuration according to claims 34, further comprising a deformation body being reversibly deformed by braking and having sensors for measuring a braking force.

42. The configuration according to claim 34, wherein in a case of an electric actuator a current measuring device and/or voltage measuring device is assigned thereto for measuring the braking force.

43. The configuration according to claim 34, further comprising a high-speed activation stage having an input side supplied with a measured variable being proportional to the deceleration and with a further measured variable which is proportional to a speed of the rail vehicle, and said high-speed activation stage is embodied in such a way that said high-speed activation stage checks the measured variable and the further measured variable with respect to their signs, and in a case of identical signs immediately generates an error signal for connecting a further brake system.

44. The configuration according to claim 43, wherein said wherein said measuring device has an inertia sensor package with which a magnitude and signs of the deceleration and the speed of the rail vehicle are determined.

* * * * *